US008250000B2

(12) United States Patent
Ogg

(10) Patent No.: US 8,250,000 B2
(45) Date of Patent: Aug. 21, 2012

(54) SYSTEM AND METHOD FOR HIGH-SPEED POSTAGE APPLICATION MANAGEMENT

(75) Inventor: Craig Ogg, Long Beach, CA (US)

(73) Assignee: Stamps.com Inc., Los Angeles, CA (US)

( * ) Notice: Subject to any disclaimer, the term of this patent is extended or adjusted under 35 U.S.C. 154(b) by 2101 days.

(21) Appl. No.: 10/677,619

(22) Filed: Oct. 2, 2003

(65) Prior Publication Data

US 2005/0075990 A1 Apr. 7, 2005

(51) Int. Cl.
*G06F 17/00* (2006.01)
(52) U.S. Cl. .......................................................... 705/401
(58) Field of Classification Search ................... 705/401
See application file for complete search history.

(56) References Cited

U.S. PATENT DOCUMENTS

| | | | | | |
|---|---|---|---|---|---|
| 4,742,878 | A | * | 5/1988 | Freeman et al. | 177/25.15 |
| 4,829,443 | A | * | 5/1989 | Pintsov et al. | 705/406 |
| 5,079,714 | A | * | 1/1992 | Manduley et al. | 700/219 |
| 5,468,945 | A | * | 11/1995 | Huggett et al. | 235/462.02 |
| 5,612,888 | A | * | 3/1997 | Chang et al. | 700/221 |
| 5,684,706 | A | * | 11/1997 | Harman et al. | 700/95 |
| 6,041,569 | A | * | 3/2000 | Freeman et al. | 53/131.2 |
| 6,173,274 | B1 | * | 1/2001 | Ryan, Jr. | 705/408 |
| 6,226,626 | B1 | * | 5/2001 | Thiel | 705/407 |
| 7,363,105 | B2 | * | 4/2008 | Smith et al. | 700/220 |
| 7,769,694 | B2 | * | 8/2010 | Schwartz et al. | 705/60 |
| 2001/0042052 | A1 | * | 11/2001 | Leon | 705/401 |
| 2004/0088267 | A1 | * | 5/2004 | Rasmussen et al. | 705/407 |

OTHER PUBLICATIONS

"Information-Based Indicia Program (IBIP) Performance Criteria for Information-Based Indicia and Security Architecture for Open IBI Postage Evidencing Systems", Feb. 23, 2000, The United States Postal Service (USPS), 80 pages.

* cited by examiner

*Primary Examiner* — John Hayes
*Assistant Examiner* — Tonya Joseph
(74) *Attorney, Agent, or Firm* — Fulbright & Jaworski L.L.P.

(57) ABSTRACT

A system and method for high-speed processing of mail pieces is disclosed. The high-speed system includes a conveyor system for transferring mail pieces among two or more mail processing components and a controller for directing the operations of the components. A postage computing device calculates the postage value due for each mail piece. A postage application printer prints postage information, such as Information-Based Indicia (IBI), on the mail pieces that are being moved by the conveyor system. A computer processing system stores information related to the processing of each mail piece and provides the controller with the processing information.

19 Claims, 3 Drawing Sheets

SYSTEM AND METHOD FOR HIGH-SPEED POSTAGE APPLICATION MANAGEMENT

CROSS-REFERENCE TO RELATED APPLICATIONS

The present application is related to co-pending U.S. patent application Ser. No. 10/606,579, entitled "SYSTEM AND METHOD FOR AUTOMATICALLY PROCESSING MAIL," filed Jun. 26, 2003; co-pending U.S. patent application Ser. No. 10/643,745, entitled "SYSTEM AND METHOD FOR DYNAMICALLY PARTITIONING A POSTAGE EVIDENCING METER," filed Aug. 19, 2003; and to concurrently filed, co-pending and commonly assigned U.S. patent application Ser. No. 10/677,829, filed Oct. 10, 2003, entitled "SYSTEM AND METHOD FOR ACCESSING A REMOTE POSTAGE METER ACCOUNT FROM A DEVICE THAT HAS A DEDICATED LOCAL METER AND ACCOUNT," the disclosures of which are hereby incorporated by reference.

TECHNICAL FIELD

The present invention is generally related to high-speed mail processing systems and, more particularly, to a high-speed mail handling system that applies postage or Information-Based Indicia (IBI) to each mail piece on a piece-by-piece basis.

BACKGROUND

Approximately eighty percent of the current stream of letter mail is produced in the high-speed postage environment. Postage is produced at about 70,000 pieces per hour by high-speed postage machines. Typically, items such as utility bills, direct mail pieces and catalogs are processed in this manner. These items are produced on machines that are generically called inserters. Mail pieces move along a conveyor belt through the various components of the machine. Postage is applied on the mail pieces in various ways, such as permit mail or metered mail.

In the case of metered mail, at the end of the high-speed conveyor belt, there is a traditional electro-mechanical meter that applies postage to the items. A plate representing the postage value is pressed down on each mail piece to mark the postage. The postage is printed with a phosphorescent ink. The development of meter machines has not kept up with improvements in the rest of the high speed postage equipment. As a result, the meters are actually slower than the rest of the machine. In other words, the other elements the high-speed process, such as inserters, folders and stuffers, move mail faster than the traditional meter can print the required postage.

One example of a high-speed system is a manifest system. The manifest system is an enhancement to the United States Postal Service's (USPS) permit system, which allows non-unique conditions to be applied to each envelope that indicated the postage that should be paid for the envelope. The permit system simply identifies the permit holder's number and where it is being mailed from and the class of mail to be used. In the permit system, all pieces needed to be of identical weight and of an identical mail class. The pieces where then weighed to determine the total postage due. The manifesting system allows pieces of various weights and mail classes to be mixed into a single batch by applying a unique number to each mail piece. That unique number is keyed to a character code that describes the rate category, the weight of the mail piece and the postage amount for that individual piece.

The mail pieces are presented along with a document that describes each piece within the mailing, including each piece's unique number and weight, and the postage amount for each piece. This information can then be checked in a statistical fashion in order to insure that those mail pieces are actually in the permit system. This system requires inspection upon presentment of the mailing to the USPS in order to assure compliance, and requires more steps and more bookkeeping than system that use live postage.

As is well-known, postage is based on the weight of the mail items. Some types of mail, such as bills, will include a different number of pages in each piece. For example, customers who have charged a lot of purchases may have more pages in their credit card bills than customers who have made a single purchase. Additionally, some advertising inserts may be included in some customers bills, but not others. Therefore, each mail piece will have a different weight. This causes a problem with traditional meters because, in the high-speed postage environment, the meters typically need to be set up for a single postage value because the postage value cannot be changed quickly. Every piece that goes through the line needs to have the same postage value applied in the traditional high-speed mailing environment.

Work-arounds for this problem have been attempted, such as physically splitting the processing line to send mail pieces to multiple postage meters, wherein each meter is set at a different postage value. While this arrangement allows different postage values to be applied to different mail pieces of varying weight, this is an expensive solution that requires additional equipment, such as multiple postage meters and a mechanism to sort pieces by weight. Additionally, in this solution, the postage value options are limited by the number of meters that are installed.

SUMMARY OF THE INVENTION

The present invention is directed to a system and method that uses Information-Based Indicia (IBI) printed by high-speed printers that operate faster than traditional postage meters.

In the high-speed environment there is no requirement for the phosphorescent ink that used in traditional postage meters. The phosphorescent ink is used in traditional mail to properly face the mail pieces. However, the mail pieces that come out of the high-speed environment are required to be prefaced. "Facing" is the process of identifying the upper right-hand corner of a mail piece using the phosphorescent ink in the postage. When mail enters the mail stream through a mailbox or mail slot, the pieces are jumbled together and it is not readily known where the upper right hand-corner is on the envelope. In order for the USPS to automatically identify the address block, it needs to locate the upper right-hand corner through the postage mechanism so it can then locate the address block on the face of the envelope. Optical Character Recognition (OCR) is applied to the address text to determine the destination address for the mail piece.

The mail pieces go through a machine called the automatic facer/canceller that determines the upper right-hand corner of the envelope. With traditional stamps, the facer/canceller can identify the upper right-hand corner by looking for the phosphor ink. The mail items that come out of the high speed environment are required to be sorted so that the upper right-hand corner is known, but there is no need to be able to do that in an automated fashion. Therefore, we can eliminate from the high-speed system all those issues associated with facing without affecting the mail procedures that are already in place.

The phosphor ink is also required as a security measure to protect the postage value since it is controlled. An alternative technology using different security measures is available to protect the postage value. The alternative system involves printing Information-Based Indicia (IBI), which is a two-dimensional bar code that is digitally signed with special data elements. The IBI can be printed onto envelopes using, for example, a laser or ink-jet printer. By using this postage-protection technology and by not requiring the use of special ink, high-speed ink-jet printers can be used to print not only postage, but also the rest of the envelope, including the address and the return address. All of this information can be printed at one time.

By tracking what happens early in the high-speed line, such as the components that are going into a mail piece and how many pages are in each mail piece, the system can calculate the weight of each mail piece. Using the weight information, the system can dynamically calculate the amount of postage that is due for each piece. This postage can be applied using IBI technology when the mail piece arrives at the printer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 3:
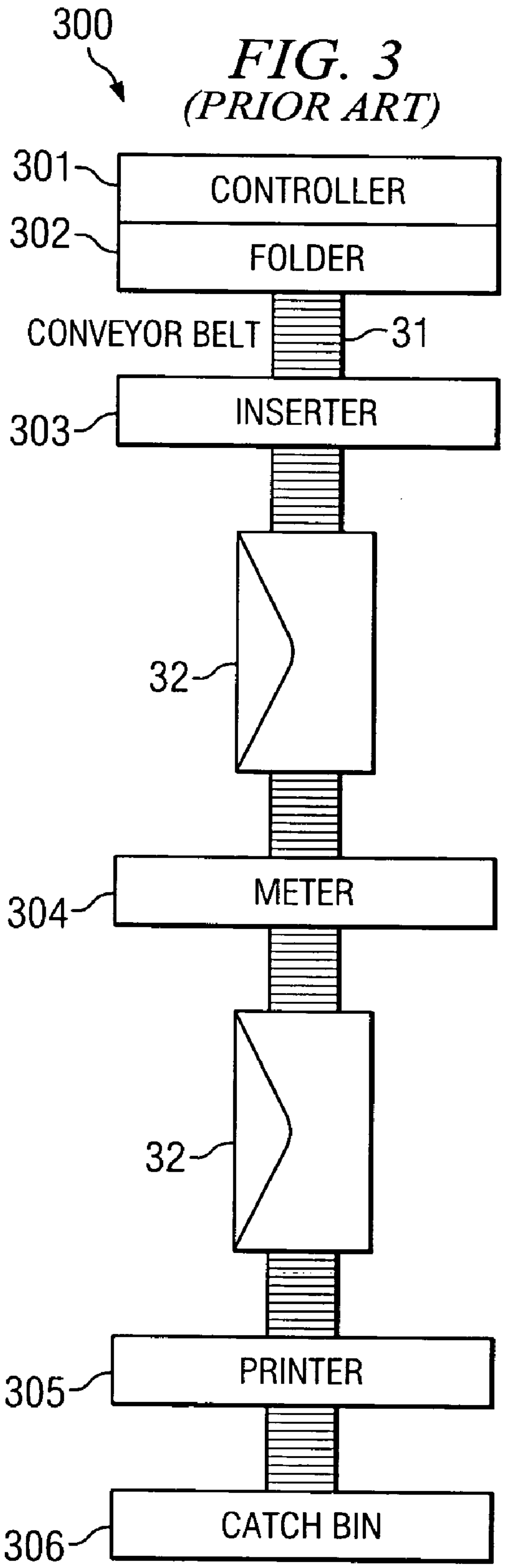
FIG. 3 (PRIOR ART)
FIG. 3 is a block diagram of a prior art high-speed mail processing system.

FIG. 3 illustrates an existing system 300 for processing mail pieces. Controller 301 communicates with folder 302, inserter 303, meter 304, and printer 305 and controls the entire process. The component parts of each mail piece travel through folder 302 where they are assembled and folded. The folded pieces then travel along conveyor belt 31 to inserter

303 where the folded pieces are inserted into an envelope. Stuffed envelope 32 is then moved by conveyor belt 31 past meter 304, which applies postage of a predesignated value to envelope 32. Marked envelope 32 then travels along conveyor 31 to printer 305 where the addressing information is printed. Envelope 32 continues down conveyor 31 to catch bin 306 where it is stored in sorted order.

It will be understood by those of skill in the art that any of devices 302, 303, or 305 can be eliminated from system 300, if necessary. Meter 304 is a mechanical imprint stamp and, therefore, must print all the postage the same way. Accordingly, in the existing systems, every letter 32 must have the same weight and must be of the same class. If the weight or class vary, the machine must be stopped and meter 304 has to be reset for a new class or weight. In situations where multiple postages are required, conveyor belt 31 could be split (not shown) into two or more paths after inserter 303 and prior to meter 304. Each of the paths would have a separate meter 304, each meter having postage for a unique class and weight. In this matter multiple postage amounts may be applied using the existing high-speed production line. However, this requires additional equipment and, therefore, additional expense. Also, the number of available postage options is limited by the number of meters 304 that are added to the line.

Figure 1:
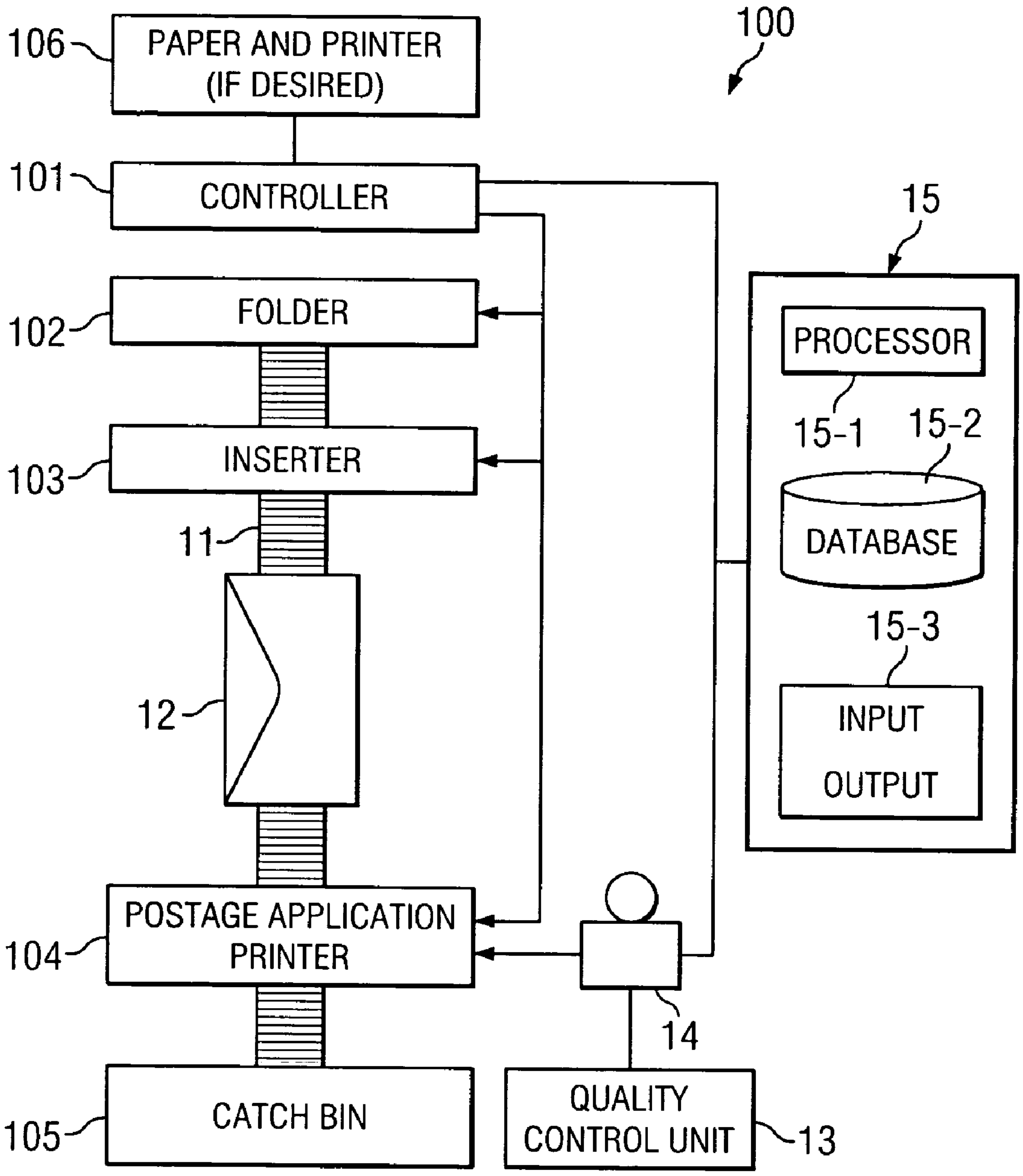
FIG. 1 is a block diagram of a high-speed mail processing system incorporating embodiments of the present invention.

FIG. 1 illustrates high-speed mailing system 100 embodying aspects of the present invention. System 100 includes some of the same components as used in the prior art system illustrated in FIG. 3. Controller 101 communicates with folder 102, inserter 103, and postage application printer 104, and controls the processing of the individual mail pieces as they travel through system 100. Controller 101 may be any device now known or later developed for processing digital information and for controlling other devices, such as a microprocessor, Application Specific Integrated Circuit (ASIC), or the like.

Completed mail pieces are stored in catch bin 105. System 100 also includes quality control unit 13 and computer 15, which are coupled to controller 101 and postage computing device 14. Computer 15 includes processor 15-1, database 15-2 and input/output device 15-3. Processor 15-1 may be any device now known or later developed for processing digital information, such as a microprocessor, Application Specific Integrated Circuit (ASIC), or the like. Database 15-2 may be any device capable of storing information in a digital format, such as a Random Access Memory (RAM), a Read Only Memory (ROM), a hard drive, a flash memory, a cache memory, or the like. Input/output device Computer 15 receives work order information for processing various mail pieces. As the work order information is received, computer 15 communicates with controller 101 regarding how to handle each particular mail piece. Using the instructions provided by computer 15, controller 101 directs system 100 to assemble and fold the mail piece in folder 102. The folded mail piece travels down conveyor 11 to inserter 103 where it is inserted into an envelope. Stuffed envelope 12 is transferred down conveyor belt 11 to postage application printer 104. At this point, quality control unit 13 determines if envelope 12 has passed quality checks. For example, quality control unit 13 may ensure that the mail piece was stuffed with the proper number of pages or that the mail piece is of an expected weight. If envelope 12 has passed the quality checks, postage is applied by postage application printer 104.

The printed postage amount is computed in postage computing device 14, which uses information about the individual mail piece from computer 15. System 100 is able to determine the postage due on a piece-by-piece basis. Also, unlike a traditional postage meter, such as meter 304, that can only print a fixed postage amount at any time, postage application printer 104 can print postage for any postal class and for any weight. Accordingly, in system 100, the mail pieces can vary by class and weight and a single production line can be used to process these mail pieces. After the postage is applied by postage application printer 104, the mail piece travels down conveyor belt 11 to catch bin 105 where it is stored in sorted order.

In a preferred embodiment, postage application printer 104 is a high-speed ink jet printer that prints Information-Based Indicia (IBI) on stuffed envelopes 12. Postage application printer 104 may also print other information, such as the destination address. System 100 may clear the addresses through a USPS database using address matching software to correct mistakes and minimize invalid addresses. Postage application printer 104 also has the advantage over prior art postage meters of being able to apply the postage in any orientation. Therefore, stuffed envelope 12 can be output from inserter 103 in any orientation. Controller 101 knows the orientation of the envelope as it is produced by inserter 103 and can identify to postage application printer 104 which corner of the envelope is the upper right-hand corner so that the postage is printed in the correct location. In the prior art postage meters, the stuffed envelopes must all be faced and presented in the same orientation so that the meter can stamp the postage in the same area on each envelope, which is typically in the upper right-hand corner.

In one embodiment, computer 15 is a separate device as illustrated in FIG. 1. In other embodiments, computer 15 may be incorporated as part of postage computing device 14 or controller 101, or all three components may be embodied as a single device. Database 15-2 contains information regarding the mail pieces to be processed by system 100. This information includes items such as the address, mail class, folding method, weights of the inserted pages, and the other information to be used for each production job. Computer 15 interacts with controller 101 to control each job. Controller 101 directs folder 102 to combine and fold the mail inserts in the desired manner and directs inserter 103 as to how the envelope should be stuffed. Finally, controller 101 and/or computer 15 provide postage computing device 14 with the weight and class of the mail pieces so that the postage value can be computed. Controller 101 and/or postage computing device 14 then direct postage application printer 104 to print the calculated postage value.

It will be understood that postage application printer 104 can print postage in the upper right-hand corner or in any other position on envelope 12. For example, computer 15 may instruct controller 101 that one or more of envelopes 12 have a printed border, such as the standard red and blue airmail border or other design. Accordingly, controller 101 may direct postage application printer 104 to offset the IBI so that it does not overlap the border. Alternatively, using the information provided by computer 15, controller 101 may direct postage application printer 104 to print an airmail border or a decorative border on envelope 12. For example, if controller 101 recognizes that a particular envelope 12 is directed to an overseas address, controller 101 directs printer 104 to add an airmail boarder to envelope 12 in addition to the IBI or postage.

Other information may also be applied to envelope 12 by printer 104. For example, it is known that companies will use envelopes with terms such as "IMPORTANT," "FINAL NOTICE," "CONFIDENTIAL," and other phrases on envelopes for marketing purposes or to catch the recipients attention. The present invention allows such terms to be added to one or more envelopes in a high-speed mail processing system. Accordingly, special pre-printed envelopes are not needed in system 100. Instead, standard envelopes may be modified by printer 104. This allows the message or border on an envelope to be modified easily in real-time, without the need to order special envelopes. Printer 104 may also add identifying information, such as company names and logos, advertising slogans or other designs to the envelopes.

The postage or IBI applied via postage application printer 104 may be different for each mail piece. In system 100, there is no requirement that all of the mail pieces flowing on conveyor 11 have the same postage or be of the same class. Therefore, it is possible to intersperse different types of mail pieces and even to simultaneously process mail pieces from different companies. Each of the mail pieces is tracked by controller 101 and computer 15 so that system 100 tracks the proper postage for each mail piece as it is processed through the system.

Also, because a unique postage can be applied to each mail piece, system 100 can continuously operate. For example, in one embodiment, printer 106 is stationed ahead of folder 102. Under the control of computer 15, printer 106 prints the mailing material on blank paper from an external source. Computer 15 directs what should be printed by printer 106 and how those sheets should be combined in folder 102 and inserter 103. Then, the proper postage and other information, such as the address, marketing stamps, and/or a border, is applied by printer 104.

Figure 2:
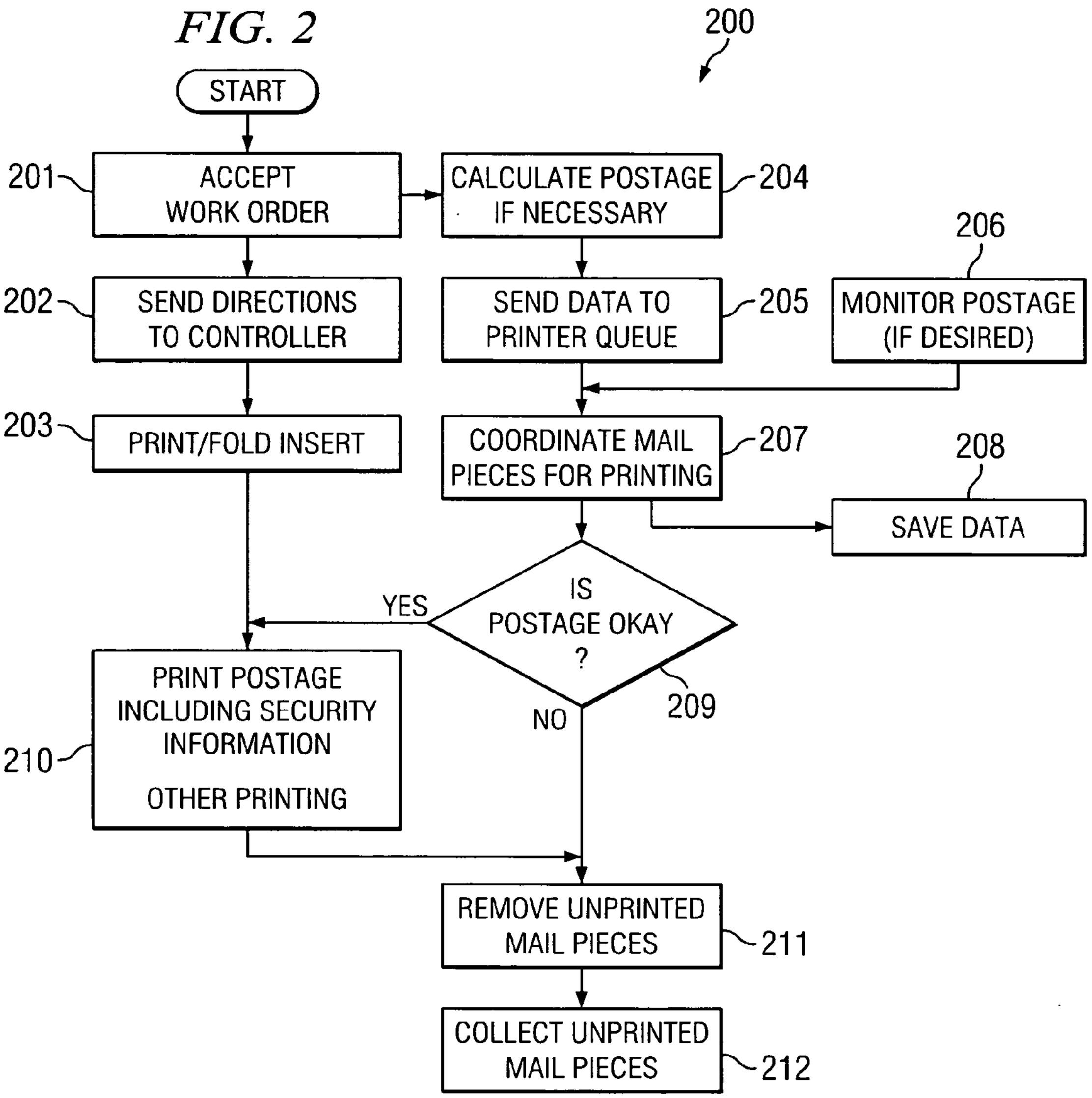
FIG. 2 is a flow chart illustrating a process incorporating embodiments of the present invention.

FIG. 2 shows a typical process 200 wherein starting at 201 work orders are accepted for processing mail pieces. At 202, directions are sent to the controller including information about how to process the mailing pieces. At 203, the controller directs and controls the printer, folder and inserter to ensure that the mailing prices are printed, folded and inserted in envelopes properly. In a parallel path, after accepting the work order at 201, the system calculates the postage value at 204. Postage data is sent to a queue for the postage application printer at 205. The postage data may be postage indicia, bar code data or an image representing the postage amount. In one embodiment, the postage indicia or bar code may include a postage amount and security information, such as a digital signature. The postage printer prints the indicia, bar code or other postage data on the envelope.

The postage calculation is optionally monitored by a quality check at 206 to ensure that the correct postage is being used. At 207, the system monitors the progress of the mail pieces and coordinates the presentation of the calculated postage data with the associated mail pieces. The calculated postage values can be saved at 208, for example, to use in later mailing jobs or to monitor the total amount of postage used. At 209, if the postage amount passes the quality check and is properly associated with one or more of the mail pieces, then the postage is sent to the postage application printer for printing at 210. Additional information, such as addresses, airmail borders, or other notations, are also printed at 210.

At 211, any mail pieces that failed the quality check or that were not printed are removed from the process. At 212, the unprinted mail pieces are collected for further processing, such as hand-stamping or destruction.

It will be understood that the process illustrated in FIG. 2 may be controlled by a device such as controller 101 or computer 15 of FIG. 1. In such embodiments, computer 15 has all the required information necessary to process the mail pieces. That would include the addresses, mail class, folding methods, and the like. It is expected that in each situation the run will have different requirements. For example, sometimes folding may not be required and other times the addresses will be preprinted on the envelopes.

The information about each mail piece is sent to controller 101 either individually or for the entire job. Controller 101 could also handle all of the information itself and control the entire process. Controller 101 tracks the position of each mail piece and instructs each unit in the system what to do as the piece arrives. Typically, the same action will be applied to each piece in a single run. Controller 101 or computer 15 calculates the weight of each piece or the weight may be measured by a scale in the line in some embodiments. Controller 101 then requests postage based upon the weight, class and destination for the mail piece so that the postage is available at the postage application printer 104 at the exact time that the mail piece arrives. The postage is applied and printing can occur at the exact same time on the envelope as necessary for address and other information.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A high-speed mail processing system having a conveyor system for transferring a plurality of mail pieces among two or more mail processing components and a controller for directing the operations of the components, the system comprising:

a postage computing device for separately calculating postage value due for each individual mail piece of said plurality of mail pieces, said postage computing device operable to use said calculated postage value to generate an information based postage indicia for a mail piece of said plurality of mail pieces in parallel with the mail piece of said plurality of mail pieces being physically created and processed by at least one mail processing component of said two or more mail processing components;

a postage application printer positioned to print said information based postage indicia on the mail piece of said plurality of mail pieces that is being moved by the conveyor system, wherein said information based postage indicia is available for printing by said postage application printer at the time the mail piece of said plurality of mail pieces arrives at said postage application printer; and a computer processing system for storing information related to the processing of each individual mail piece of said plurality of mail pieces and for providing the controller with the processing information;

wherein said controller tracks the position of each individual mail piece of said plurality of mail pieces and instructs components of said high speed mail processing system regarding the processing of said each individual mail piece of said plurality of mail pieces at said components.

2. The system of claim 1 further comprising:

a quality control unit adapted to monitor the postage value calculated by the postage computing device.

3. The system of claim 1 further comprising:

a mail piece printer for printing documents that will be combined into the mail pieces.

4. The system of claim 1 wherein the mail processing components include at least one of a folder and an inserter.

5. The system of claim 1 wherein the controller and the computer processing system are the same device.

6. The system of claim 1 wherein the controller, the computer processing system and the postage computing device are the same device.

7. The system of claim 1 wherein the postage application printer is a high-speed ink jet printer.

8. The system of claim 1 wherein the postage application prints other information on the mail piece of said plurality of mail pieces in addition to the postage information.

9. The system of claim 8 wherein the other information includes one or more items selected from the group consisting of:

marketing information;

address information; and an envelope border.

10. A method for applying postage to mail pieces in a high-speed mail processing system comprising:

receiving processing instructions that identify how each mail piece of said mail pieces should be processed;

controlling the components of the high-speed processing system to comply with the processing instructions; wherein said controlling includes tracking the position of the mail pieces and instructing components of said high speed mail processing system regarding the processing of the mail pieces at said components;

individually calculating a postage value for said each individual mail piece of said mail pieces; and generating an information based postage indicia, using said calculated postage value, for an individual mail piece of said each mail piece of said mail pieces in parallel with the individual mail piece being physically processed by one or more of the components, including at least one of a folder and an inserter, of said high-speed mail processing system; and printing the calculated postage value on each mail piece of said mail pieces, wherein said information based postage indicia is available for printing at the time the individual mail piece of said each mail piece of said mail pieces arrives at a printer for said printing.

11. The method of claim 10 further comprising:

folding the mail pieces;

inserting the mail pieces into an envelope; and printing the calculated postage on each envelope.

12. The method of claim 10 wherein the postage value is calculated without weighing the mail pieces.

13. The method of claim 10 further comprising:

printing other information on one or more of the mail pieces in addition to the postage value for that piece.

14. The method of claim 13 wherein the other information includes one or more items selected from the group consisting of:

marketing information;

address information; and an envelope border.

15. The method of claim 10 further comprising:

performing a quality control analysis on one or more of the calculated postage values.

16. The method of claim 11 further comprising:

printing documents to be included in each mail piece prior to folding the mail piece.

17. A system for processing mail pieces comprising: means for receiving processing instructions that identify how each mail piece should be processed;

means for controlling the components of a high-speed processing system in accordance with the processing instructions wherein said means for controlling includes a means for tracking the position of the mail pieces and instructing components of said high speed mail processing system regarding the processing of the mail pieces at said components;

means for calculating a postage value for each individual mail piece based upon a count of the number of documents included in each said individual mail piece and weights of the documents, said postage value calculated without weighing the individual mail piece, using information from said processing instructions, and in parallel with the high-speed processing of said mail piece; and a printer controlled in accordance with the processing instructions, for printing the calculated postage value on each mail piece; wherein said calculated postage value for a mailpiece of said each mailpiece is available for printing by said printer, when the mailpiece arrives at said printer.

18. The system of claim 17 wherein the printer is a high-speed printer that is capable of printing the postage value at any position or orientation on the mail pieces.

19. The method of claim 10 wherein a weight of each mail piece varies depending upon the number of pages included in each mail piece, and wherein the postage value for each mail piece is calculated based upon a count of the number of pages included for that mail piece and weights of the pages.

* * * * *